United States Patent
Choi et al.

(10) Patent No.: US 9,740,308 B2
(45) Date of Patent: Aug. 22, 2017

(54) COMPUTER MOUSE WITH AUTOMATIC GRIP ANGLE CONTROL FUNCTION

(71) Applicants: UNIST ACADEMY-INDUSTRY RESEARCH CORPORATION, Ulsan (KR); GWANGJU UNIVERSITY INSTITUTE FOR EDUCATIONAL-INDUSTRIAL COOPERATION, Gwangju (KR)

(72) Inventors: Dong-Hee Choi, Seoul (KR); Song-Il Lee, Ulsan (KR); Jih-Hyeon Lee, Busan (KR); Gyou-Hyung Kyung, Ulsan (KR); Kyoung-Jong Park, Gwangju (KR)

(73) Assignees: UNIST (ULSAN NATIONAL INSTITUTE OF SCIENCE AND TECHNOLOGY), Ulsan (KR); GWANGJU UNIVERSITY INSTITUTE FOR EDUCATIONAL-INDUSTRIAL COOPERATION, Gwangju (KR)

( * ) Notice: Subject to any disclaimer, the term of this patent is extended or adjusted under 35 U.S.C. 154(b) by 41 days.

(21) Appl. No.: 14/758,097

(22) PCT Filed: Dec. 23, 2013

(86) PCT No.: PCT/KR2013/012051
§ 371 (c)(1),
(2) Date: Jun. 26, 2015

(87) PCT Pub. No.: WO2014/104690
PCT Pub. Date: Jul. 3, 2014

(65) Prior Publication Data
US 2015/0331503 A1 Nov. 19, 2015

(30) Foreign Application Priority Data
Dec. 26, 2012 (KR) .......................... 10-2012-0153932

(51) Int. Cl.
*G06F 3/0354* (2013.01)

(52) U.S. Cl.
CPC .. *G06F 3/03543* (2013.01); *G06F 2203/0333* (2013.01)

(58) Field of Classification Search
CPC ...................... G06F 3/03543; G06F 2203/0333
See application file for complete search history.

(56) References Cited

U.S. PATENT DOCUMENTS

2010/0253627 A1* 10/2010 Atzmon .............. G06F 3/03543
345/163
2013/0038533 A1* 2/2013 Lo ....................... G06F 3/03543
345/163

FOREIGN PATENT DOCUMENTS

KR     2002414460000      10/2001
KR     1006291670000       9/2006
(Continued)

*Primary Examiner* — Sahlu Okebato
(74) *Attorney, Agent, or Firm* — Duane Morris LLP; J. Rodman Steele, Jr.; Gregory M. Lefkowitz

(57) ABSTRACT

The purpose of the present invention is to provide a computer mouse with an automatic grip angle control function for reducing a sense of wrist fatigue by continuously changing a grip angle in a constant period during use. In order to achieve this objective, the present invention provides the computer mouse with the automatic grip angle control function, including a base having a board, which is necessary for operating the mouse and located at the upper end of the base, and an upper surface provided with a button and a wheel, and the mouse comprises: a rotational unit coupled with one side of the base and one side of the upper surface corresponding to one side of the base to enable the relative rotation of the upper surface with respect to the base; a guide unit fixed to an upper end of the base of an opposite side at which the rotational unit is located and having a gear formed on an outer surface thereof; a motor fixed to the inside of the (Continued)

upper surface; a pinion fixed to a rotary shaft of the motor; and a control unit for controlling the motor, wherein the pinion is engaged with the gear of the guide unit and the grip angle of the upper surface is changed by the rotation of the motor.

4 Claims, 4 Drawing Sheets

(56) References Cited

FOREIGN PATENT DOCUMENTS

| | | |
|---|---|---|
| KR | 2004502950000 | 9/2010 |
| WO | 2008/133366 | 11/2008 |

\* cited by examiner

COMPUTER MOUSE WITH AUTOMATIC GRIP ANGLE CONTROL FUNCTION

CROSS-REFERENCE TO RELATED APPLICATIONS

This application is a §371 national stage entry of International Application No. PCT/KR2013/012051, filed Dec. 23, 2013, which claims priority to South Korean Patent Application No. 10-2012-0153932, filed on Dec. 26, 2012, the entire contents of which are incorporated herein by reference.

TECHNICAL FIELD

The present disclosure relates to a computer mouse with an automatic grip angle control function, and more particularly, to a computer mouse with an automatic grip angle control function for continuously changing a grip angle.

BACKGROUND ART

Recently, with the development of computers and networks, many social activities are being conducted based on computers. In particular, in the case of business offices, various types of documents are prepared and various types of works are done by using computers, and thus works using a computer input device occupy much of the daily work.

The computer input device typically includes a keyboard and a mouse, and the mouse is used to do a basic task, and the keyboard is specially used to input characters.

Thus, for the most part of the work, it is necessary to use the mouse, but the continuous use of the mouse can lead to musculoskeletal disorders. In particular, the repetitive use of a mouse button leads to frequent use of ligaments of a middle finger, and has often caused especially musculoskeletal disorders of an index finger and a middle finger.

To overcome this drawback, new types of mice have been proposed,

For example, Korean Utility Model Registration No. 0442444 discloses a grip-type mouse including a body and a grip part to which an articular structure is applied to allow optimal adaptation to a physical condition of a user, wherein the grip part is protrusively bent backwards and has a shape that enables 360 degree rotation and vertical angle control to allow optimal adaptation to a physical condition of a user, thereby minimizing wrist strain when using for a long period and giving a comfortable feeling during manipulation of the mouse, the grip type structure has effects of allowing a deliberate movement and precise manipulation of a cursor and prevents the body from moving, allowing a more stable and precise work, and the body may have switches of a touch type having a structure that prevents a malfunction by removing static electricity erroneously applied on a touch button, and in which a touch is easily recognized through a speaker configured to make a short sound when a touch on the switch is sensed and an improved click's feeling is provided, the use of an auxiliary button of the grip part produces an effect of facilitating button clicking when a finger is impaired or at a simple work, and a finger support is formed between the switches to reduce the strain on fingers and wrists when using for a long period.

Also, Korean Utility Model Registration No, 450295 discloses an ergonomic mouse in which a grip part for gripping the mouse has a shape that protrudes upwards in an inclined state at an angle of from 70 degrees to 80 degrees relative to the bottom surface, so that the mouse may be used in a writing tool grip posture, and a body and a support are integrally formed in an ergonomic grip shape to provide convenience in use.

These inventions have an excellent effect in that they provide an improved grip feel by modifying the shape of a traditional typical mouse, thereby minimizing hand strain when using for a long period, but have the following disadvantages: they are unable to respond to all different hand sizes of mouse users and thus have to produce mice with various sizes, and customers have to buy a mouse best suitable for their hand size.

Therefore, there is a need for a mouse with a function of continuously changing an angle of the mouse to alleviate wrist fatigue resulting from the continuous use at a constant angle, while responding to various hand sizes and hand shapes of users with a single mouse.

DISCLOSURE

Technical Problem

The present disclosure is designed to overcome the drawbacks of the related conventional arts, and therefore, the present disclosure aims to provide a computer mouse with an automatic grip angle control function that continuously changes a grip angle at a predetermined time interval during usage to reduce wrist fatigue.

Technical Solution

To achieve the object, the present disclosure provides a computer mouse with an automatic grip angle control function including a base including a board necessary for operating the mouse, and an upper surface disposed on the base and having a button and a wheel mounted thereon, the computer mouse including a rotation unit coupled respectively to one side of the base and one side of the upper surface corresponding to one side of the base to enable a relative rotation of the upper surface with respect to the base, a guide unit fixed on the base at a side opposite to the side in which the rotation unit is disposed, and having a gear formed on an outer surface thereof, a motor fixed to an inside of the upper surface, a pinion fixed to a rotary shaft of the motor, and a control unit for controlling the motor, wherein the pinion is engaged with the gear of the guide unit to change a grip angle of the upper surface by the rotation of the motor.

Preferably, the outer surface of the guide unit may be a circular arc with a rotation axis of the rotation unit as a center.

More preferably, the control unit may further include a timer, and may drive the motor at a predetermined time interval based on an output of the timer.

More preferably, the control unit may drive the motor within a range between 11° and 20° of a straight line connecting the centers of two buttons formed on the upper surface with respect to the base.

More preferably, the control unit may drive the motor repetitively to dispose the upper surface within the range between 11° and 20° of the straight line connecting the centers of the two buttons formed on the upper surface with respect to the base.

More preferably, the base may further include a protection cover to cover a surface exposed by the rotation of the upper surface.

More preferably, the rotation axis of the rotation unit may range from −10° to +10° with respect of the wheel face.

Advantageous Effects

The computer mouse according to the present disclosure has a reduction effect for fatigue in wrists resulting from the continuous use of the mouse in the same posture as the computer mouse can change an angle on the top of the mouse at a predetermined time interval during use.

BEST MODE

Hereinafter, the present disclosure is described in detail with reference to accompanying drawings.

Figure 1:
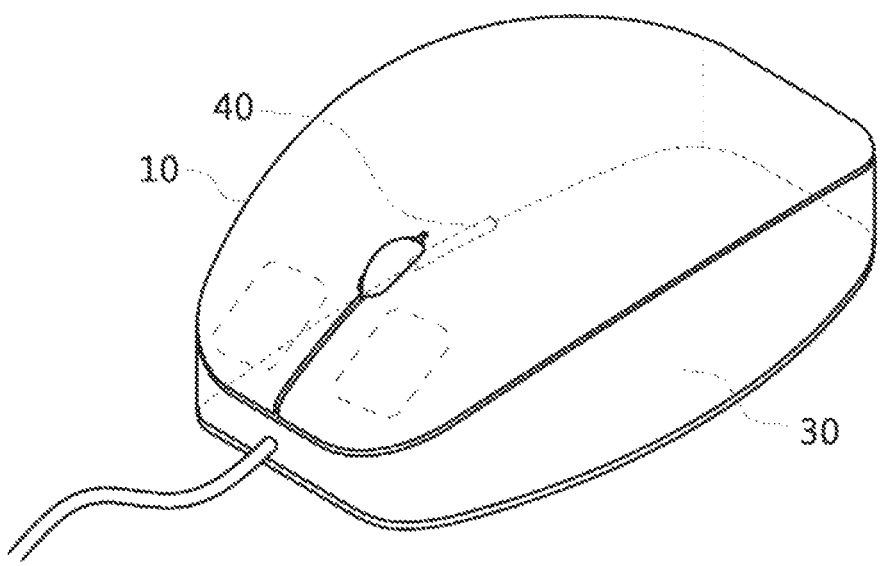
FIG. 1 is a perspective view showing an appearance of a computer rouse with an automatic grip angle control function according to the present disclosure.

A computer mouse 100 with an automatic grip angle control function according to the present disclosure is constructed to include a base 10, an upper surface 30, and a rotation unit 40 coupled between the base 10 and the upper surface 30 as shown in FIG. 1.

Figure 2:
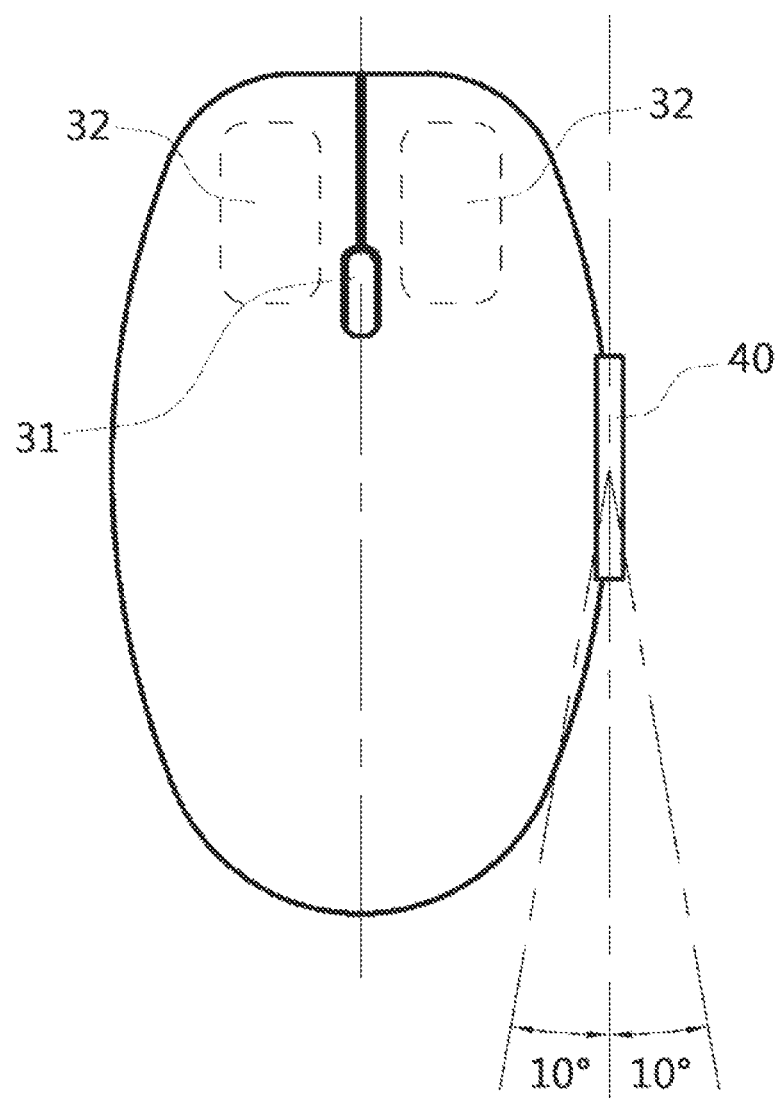
FIG. 2 is a top view of FIG. 1.
Figure 3:
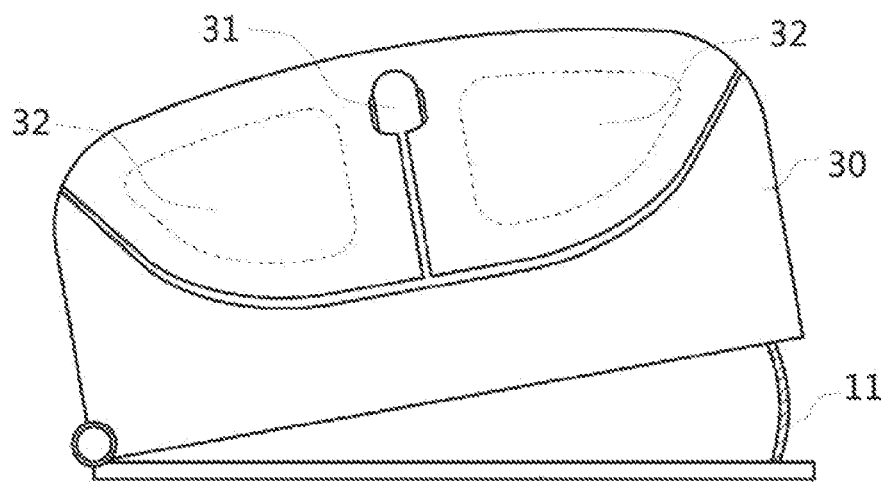
FIG. 3 is a front view showing rotation of an upper surface in FIG. 1.

As shown in FIG. 2, the rotation unit 40 is installed at the side of the base 10, and has a rotation axis that is linked to a wheel 31 face formed on the upper surface 30.

The rotation axis of the rotation unit 40 is preferably configured identically to the wheel 31 face, but may be formed slantingly at an angle of ±10°, if necessary.

Thus, the upper surface 30 may rotate around the rotation axis of the rotation unit 40 with respect to the base 10.

At the side of the base 10, a protection cover 11 may be formed at the side to cover a space exposed by the rotation of the upper surface 30.

Figure 4:
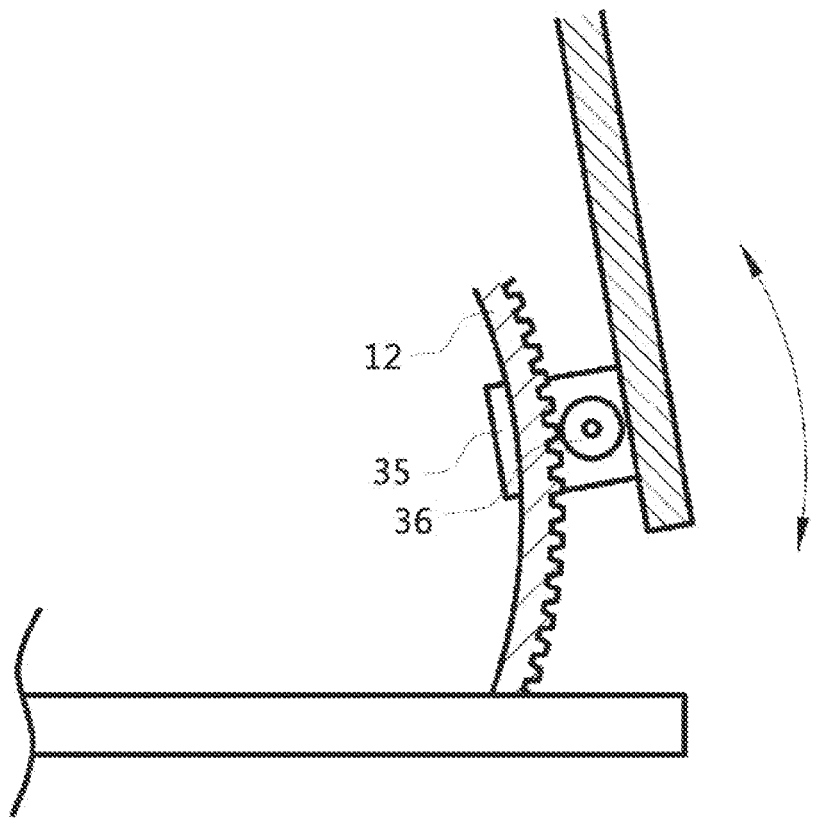
FIG. 4 is a diagram showing coupling of a motor and a guide unit in FIG. 1.

Meanwhile, a guide unit 12 is attached onto the base 10 as shown in FIG. 4.

The guide unit 12 has an edge formed of a circular arc with the rotation axis of the rotation unit 40 as the center, and has a gear formed on the surface thereof.

To have a structural strength, the guide unit 12 may be implemented in any shape only if an arc of the gear part is the same.

A motor 35 is attached to the inside of the upper surface 30, and a pinion 36 is coupled to a rotary shaft of the motor 35.

The motor 35 is attached to the inside of the upper surface 30 to engage the pinion 36 with the gear of the guide unit 12.

Thus, when the motor 35 rotates, the upper surface 30 rotates around the rotation axis of the rotation unit 40, and the grip angle of the mouse changes.

Also, if necessary, the pinion 36 and the gear formed on the guide unit 12 may be implemented in other shapes. For example, with the motor 35 attached at a different angle, a lead screw is coupled to the rotary shaft of the motor 35, and the gear formed on the guide unit 12 may be implemented as another gear that is coupled with the lead screw.

Figure 5:
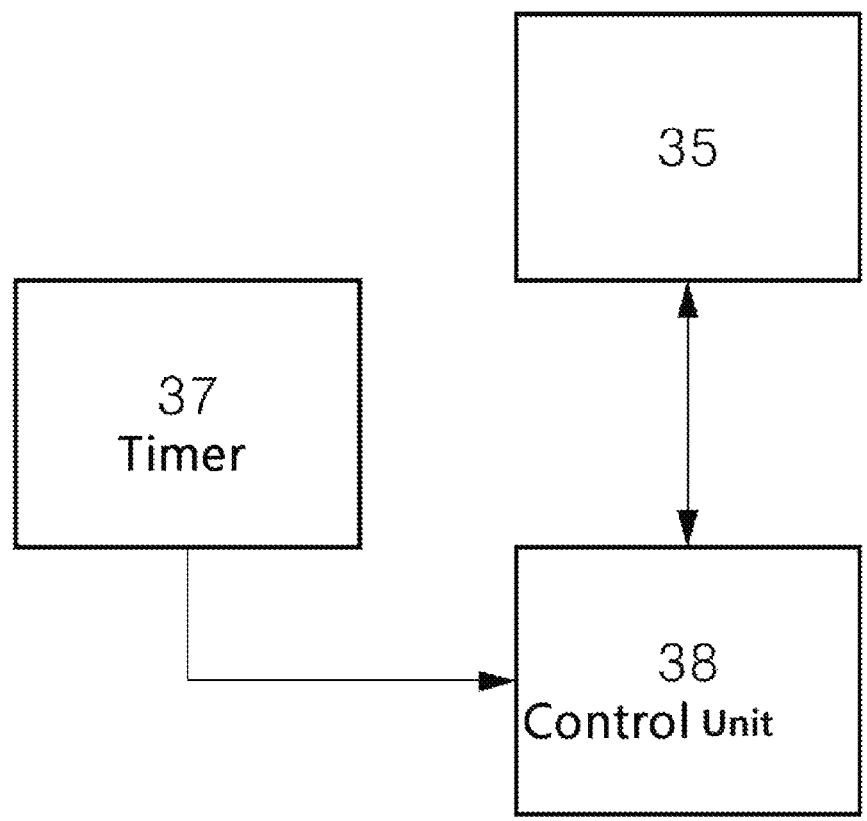
FIG. 5 is a diagram showing a configuration of a control unit that is applied to FIG. 1.

Meanwhile, the motor 35 is controlled through a control unit 38 as shown in FIG. 5.

The control unit 38 includes a separate timer 37, and continuously receive an input of a time from the timer 37 and recognizes a current time.

The control unit 38 drives the motor at a predetermined time interval based on the time of the timer 37 to adjust an angle of the upper surface 30.

Figure 6:
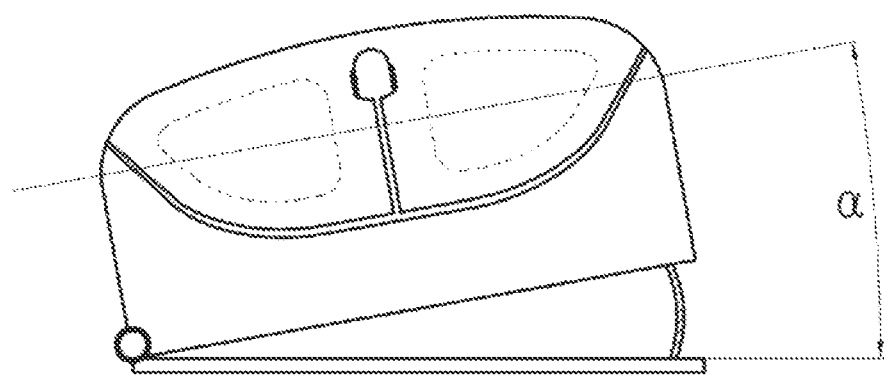
FIG. 6 is an explanatory diagram showing a rotation angle range of an upper surface shown in FIG. 1.

For the angle of the upper surface 30, as shown in FIG. 6, where an angle formed with the base 10 is α with respect to a line connecting center lines of two buttons 32, the α is preferably from 11° to 20°.

The angle range is set based on left and right tilting angles of a mouse which showed the best result related to a comfortable feeling in wrists among commercially available mouse products as an ergonomic test result, and when a degree of freedom of a wrist posture increases by decreasing or increasing left and right tilting angles, one of the main causes of musculoskeletal disorders, repetitive exposure to the same posture, may be reduced. That is, the above angle range provides diversity to wrist abductor/adductor, thereby providing a preventive effect for musculoskeletal disorders as well as a comfortable feeling of a predetermined level or more.

When needed, the control unit 38 recognizes an initial location of the motor 35, and drives the motor 35 at an optimum time to control the grip angle range to repetitively change within a range of between 11° and 20°.

For example, the control unit 38 may allow the rotation of from the initial angle 11° to 20° with a change angle of 1° by units of 10 seconds, and subsequently, take control to change to 11° with a change angle of −1°, and the change angle and the time may be suitably selected.

Also, the control unit 38 and the motor 35 are preferably constructed to operate using a power source inputted by a computer.

While the present disclosure have been hereinabove illustrated and described in connection with particular embodiments, the present disclosure is not limited to these embodiments, and includes all embodiments in various forms that may be practiced by persons having ordinary skill in the technical field pertaining to the invention without departing from the spirit and scope of the present disclosure as claimed by the appended claims.

The invention claimed is:

1. A computer mouse with an automatic grip angle control function comprising a base including a board necessary for operating the mouse, and an upper surface disposed on the base and having a button and a wheel mounted thereon, the computer mouse comprising:
   a rotation unit coupled respectively to one side of the base and one side of the upper surface corresponding to one side of the base to enable a relative rotation of the upper surface with respect to the base;
   a guide unit fixed on the base at a side opposite to the side in which the rotation unit is disposed, and having a gear formed on an outer surface thereof;
   a motor fixed to an inside of the upper surface;
   a pinion fixed to a rotary shaft of the motor; and
   a control unit for controlling the motor,
   wherein the pinion is engaged with the gear of the guide unit to change a grip angle of the upper surface by the rotation of the motor,
   wherein the outer surface of the guide unit is a circular arc with a rotation axis of the rotation unit as a center, wherein the control unit further comprises a timer, and drives the motor at a predetermined time interval based on an output of the timer, and wherein the base further comprises a protection cover to cover a surface exposed by the rotation of the upper surface.

2. The computer mouse with an automatic grip angle control function according to claim 1, wherein the control unit drives the motor within a range between 11° and 20° of a straight line connecting the centers of two buttons formed on the upper surface with respect to the base.

3. The computer mouse with an automatic grip angle control function according to claim 2, wherein the control unit drives the motor repetitively to dispose the upper surface within the range between 11° and 20° of the straight line connecting the centers of the two buttons formed on the upper surface with respect to the base.

4. The computer mouse with an automatic grip angle control function according to claim 1, wherein a rotation axis of the rotation unit ranges from −10° to +10° with respect to a face of the wheel.

\* \* \* \* \*